US012406802B2

(12) United States Patent
Sim et al.

(10) Patent No.: US 12,406,802 B2
(45) Date of Patent: Sep. 2, 2025

(54) IGNITION COIL SYSTEM

(71) Applicants: HYUNDAI MOTOR COMPANY, Seoul (KR); KIA CORPORATION, Seoul (KR)

(72) Inventors: Kiseon Sim, Suwon-si (KR); Soo Hyung Woo, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 88 days.

(21) Appl. No.: 18/368,759

(22) Filed: Sep. 15, 2023

(65) Prior Publication Data

US 2025/0022652 A1 Jan. 16, 2025

(30) Foreign Application Priority Data

Jul. 10, 2023 (KR) ........................ 10-2023-0089260

(51) Int. Cl.
*H01F 38/12* (2006.01)
*H01T 15/00* (2006.01)

(52) U.S. Cl.
CPC .............. *H01F 38/12* (2013.01); *H01T 15/00* (2013.01)

(58) Field of Classification Search
CPC ................................ H01T 15/00; H01F 38/12
See application file for complete search history.

(56) References Cited

U.S. PATENT DOCUMENTS

| | | | | |
|---|---|---|---|---|
| 5,685,802 A * | 11/1997 | Kanno | F02B 75/20 290/40 C |
| 9,429,134 B2 | 8/2016 | Desai et al. | |
| 10,006,432 B2 | 6/2018 | Desai et al. | |
| 2010/0057324 A1* | 3/2010 | Glugla | F02P 17/12 701/111 |

* cited by examiner

*Primary Examiner* — Bryan R Perez
(74) *Attorney, Agent, or Firm* — MCDONNELL BOEHNEN HULBERT & BERGHOFF LLP

(57) ABSTRACT

An ignition coil system includes an ignition coil including a first primary coil, a second primary coil, and a secondary coil, and configured to generate a discharge current by electromagnetic induction with the first primary coil or the second primary coil, a first battery electrically connected to the first primary coil, a second battery electrically connected to the second primary coil, a first battery switch provided between the first primary coil and the first battery, and configured to block electrical power supplied from the first battery to the first primary coil, a second battery switch provided between the second primary coil and the second battery, and configured to block electrical power supplied from the second battery to the second primary coil, a first switch configured to adjust charging and discharging of the first primary coil, and a second switch configured to adjust charging and discharging of the second primary coil.

11 Claims, 4 Drawing Sheets

IGNITION COIL SYSTEM

CROSS REFERENCE TO RELATED APPLICATIONS

This application claims priority to and the benefit of Korean Patent Application No. 10-2023-0089260 filed in the Korean Intellectual Property Office on Jul. 10, 2023, the entire contents of which is incorporated herein by reference.

BACKGROUND

(a) Field

The present disclosure relates to an ignition coil system, and more particularly, to an ignition coil system capable of receiving power from two batteries.

(b) Description of the Related Art

In gasoline vehicles, a mixture of air and fuel is ignited by a spark generated by a spark plug to be combusted. That is, the air-fuel mixture injected into a combustion chamber during a compression stroke is ignited by a discharge phenomenon of the spark plug, and thus energy required for vehicle's driving is generated while undergoing a high temperature and high pressure expansion process.

The spark plug provided in the gasoline vehicle serves to ignite a compressed air-fuel mixture by spark discharge caused by a high-voltage current generated by an ignition coil.

While the vehicle is driving, if the output of the battery becomes very low due to a low state of charge (SOC) of the battery, insufficient power is supplied to the ignition coil, or no power is supplied since power is not output from the battery due to the abnormality.

If normal ignition is not achieved because power is not supplied to the ignition coil while the engine is operating, serious damage may occur to a catalytic converter at the downstream side of the engine, and a problem in that the vehicle may not drive normally may occur.

The above information disclosed in this Background section is only for enhancement of understanding of the background of the disclosure, and therefore it may contain information that does not form the prior art that is already known in this country to a person of ordinary skill in the art.

SUMMARY

The present disclosure attempts to provide an ignition coil system capable of, when the electrical power is not supplied to the ignition coil from the battery due to an abnormality, supplying electrical power to the ignition coil.

An ignition coil system may include an ignition coil including a first primary coil, a second primary coil, and a secondary coil, and configured to generate a discharge current by electromagnetic induction with the first primary coil or the second primary coil, a first battery selectively and electrically connected to the first primary coil, a second battery selectively and electrically connected to the second primary coil, a first battery switch provided between the first primary coil and the first battery, and configured to selectively block electrical power supplied from the first battery to the first primary coil, a second battery switch provided between the second primary coil and the second battery, and configured to selectively block electrical power supplied from the second battery to the second primary coil, a first switch configured to adjust charging and discharging of the first primary coil, and a second switch configured to adjust charging and discharging of the second primary coil.

The first battery may be a high voltage battery, and the second battery may be a low voltage battery.

When the first battery operates normally, the first battery switch may be turned ON, and the second battery switch may be turned OFF.

When the first battery operates abnormally, the first battery switch may be turned OFF, and the second battery switch may be turned ON.

A dwell time for charging the second primary coil through the second battery may be set longer than a dwell time for charging the first primary coil through the first battery.

An ignition coil system may include an ignition coil including two primary coils, and a secondary coil, a first battery selectively and electrically connected a first primary coil among the two primary coils, a second battery selectively and electrically connected a second primary coil among the two primary coils, a first switch configured to selectively block electrical power supplied from the first battery to the first primary coil, and configured to adjust charging and discharging of the first primary coil, and a second switch configured to selectively block electrical power supplied from the second battery to the second primary coil, and configured to adjust charging and discharging of the second primary coil.

The first battery may be a high voltage battery, and the second battery may be a low voltage battery.

The first switch may be a transistor switch that may include a first emitter terminal that is grounded, a first base terminal configured to receive a control signal, and a first collector terminal electrically connected to the first battery.

The second switch may be a transistor switch that may include a second emitter terminal that is grounded, a second base terminal configured to receive a control signal, and a second collector terminal electrically connected to the second battery.

When the first battery operates normally, the control signal may be applied only to the first base terminal, and the first primary coil may be charged and discharged by the control signal received at the first base terminal.

When the first battery operates abnormally, the control signal may be applied only to the second base terminal, and the second primary coil may be charged and discharged by the control signal received at the second base terminal.

A dwell time for charging the second primary coil through the second battery may be set longer than a dwell time for charging the first primary coil through the first battery.

According to an ignition coil system according to the present disclosure, in a vehicle provided with at least two batteries, when sufficient electrical power is not supplied to an ignition coil by a first battery, the electrical power may be supplied to the ignition coil by a second battery.

In addition, by stably and continuously supply electrical power to ignition coil, degradation of the catalytic converter may be prevented and stable driving of the vehicle may be ensured.

Other effects that may be obtained or are predicted by an embodiment will be explicitly or implicitly described in a detailed description of the present disclosure. That is, various effects that are predicted according to an exemplary embodiment will be described in the following detailed description.

BRIEF DESCRIPTION OF THE FIGURES

These drawings are for reference only in describing embodiments of the present disclosure, and therefore the technical idea of the present disclosure should not be limited to the accompanying drawings.

Figure 1:
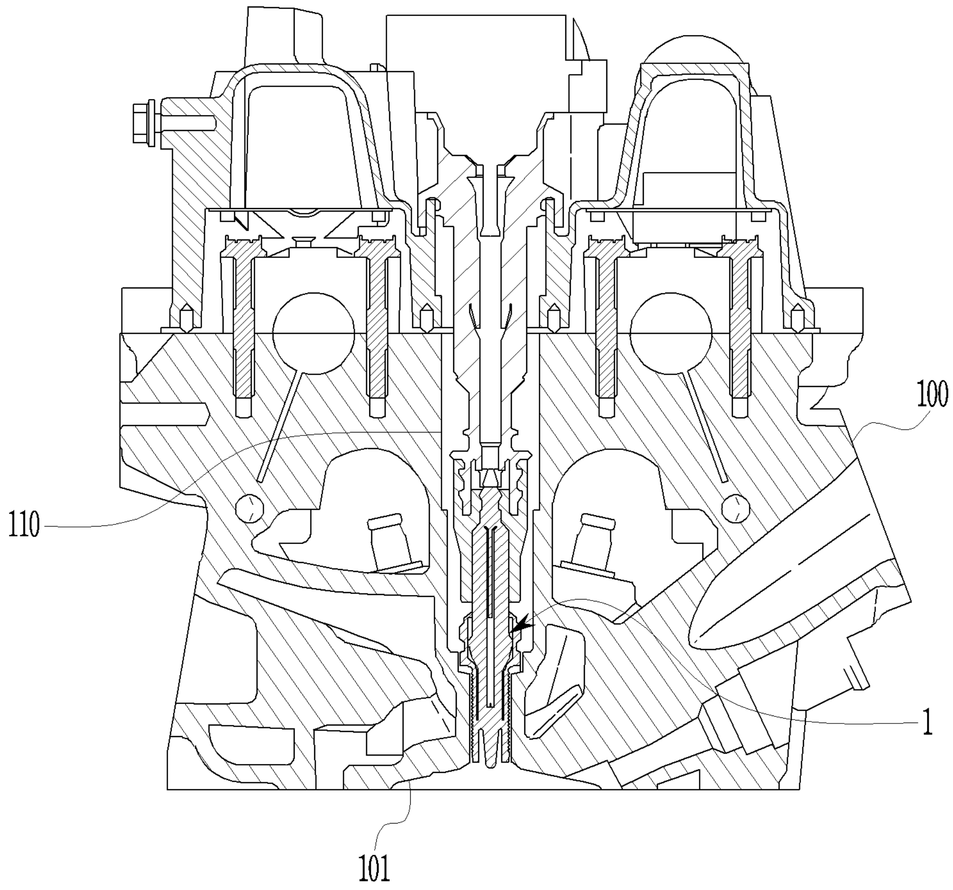
FIG. 1 is a cross-sectional view showing a configuration of an engine applied with an ignition coil system according to an embodiment.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any one or all combinations of one or more related items.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, the size and thickness of each configuration shown in the drawings are arbitrarily shown for understanding and ease of description, but the present disclosure is not limited thereto, and for clearly illustrate several portions and regions, thicknesses thereof are increased.

The terms "module" and "unit" for components used in the following description are used only in order to make the specification easier. Therefore, these terms do not have meanings or roles that distinguish them from each other by themselves.

In describing embodiments of the present specification, when it is determined that a detailed description of the well-known art associated with the present disclosure may obscure the gist of the present disclosure, it will be omitted.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not interpreted as limiting these components.

Hereinafter, an ignition coil system according to the present disclosure will be described in detail with reference to the drawings. First, the configuration of an engine to which an ignition coil system of the present disclosure is applied will be described with reference to FIG. 1.

FIG. 1 is a cross-sectional view showing a configuration of an engine applied with an ignition coil system according to an embodiment.

As shown in FIG. 1, a spark plug 1 to which an ignition coil system according to an embodiment of the present disclosure is applied is mounted on a cylinder of an engine and generates a spark discharge.

The engine to which the spark plug 1 is applied includes a cylinder block and a cylinder head 100, and the cylinder block and cylinder head 100 are coupled to form a combustion chamber 101 therein. An air/fuel mixture of air drawn into the combustion chamber 101 with the fuel is ignited by the spark discharge generated by the spark plug 1.

In the cylinder head 100, a mounting hole 110 for mounting the spark plug 1 is formed long in a vertical direction. A lower portion of the spark plug 1 mounted in the mounting hole 110 protrudes into the combustion chamber 101. A central electrode 2 and a ground electrode 3 electrically connected to an ignition coil 10 are formed in the lower portion of the spark plug 1, and the spark discharge is generated between the central electrode 2 and the ground electrode 3.

Figure 2:
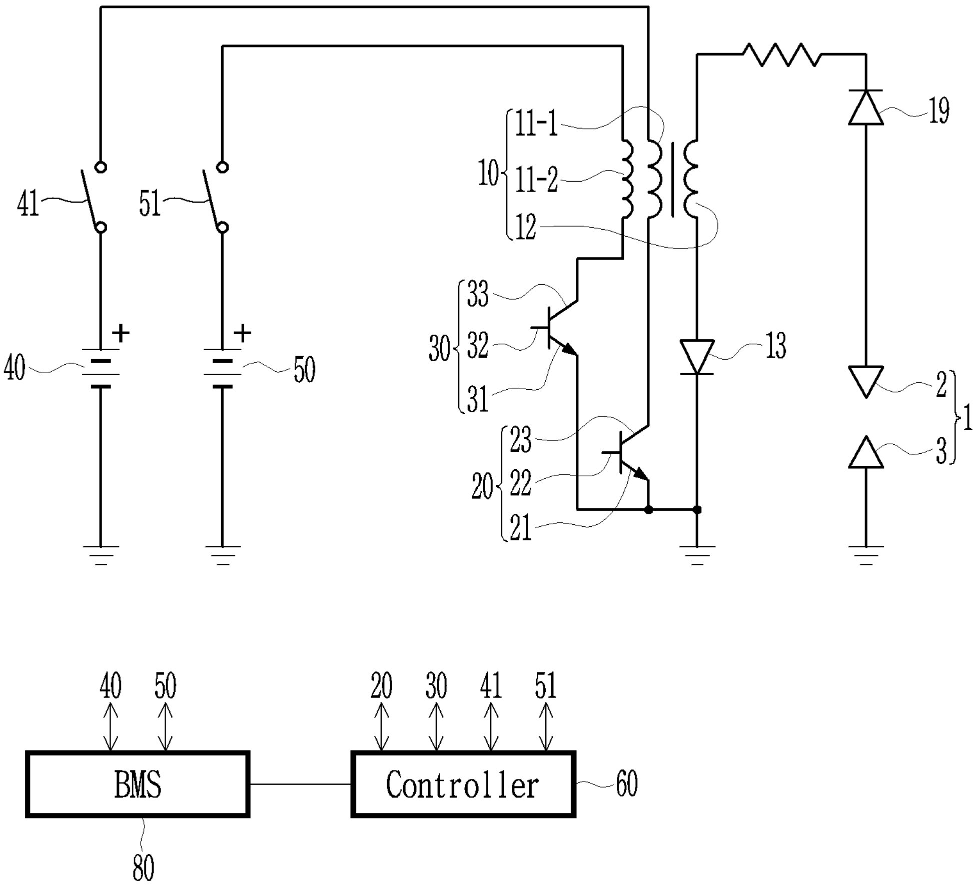
FIG. 2 is a drawing showing a configuration of an ignition coil system according to an embodiment.

FIG. 2 is a drawing showing a configuration of an ignition coil system according to an embodiment.

As shown in FIG. 2, an ignition coil system according to an embodiment may include the ignition coil 10 including a first primary coil 11-1, a second primary coil 11-2, and a secondary coil 12, a first battery 40 configured to supply electrical power to the first primary coil 11-1, a second battery 50 configured to supply electrical power to the second primary coil 11-2, a first battery switch 41 provided between the first primary coil 11-1 and the first battery 40, a second battery switch 51 provided between the second primary coil 11-2 and the second battery 50, a first switch 20 configured to adjust charging and discharging of the first primary coil 11-1, and a second switch 30 configured to adjust charging and discharging of the second primary coil 11-2.

The ignition coil 10 includes the first primary coil 11-1, the second primary coil 11-2, and the secondary coil 12, and a spark discharge is generated between the central electrode 2 and the ground electrode 3, by electromagnetic induction between the secondary coil 12 and the first primary coil 11-1 or the second primary coil 11-2.

A first end of the first primary coil 11-1 is electrically connected to the first battery 40, and a second end of the first primary coil 11-1 is grounded through the first switch 20. In addition, a first end of the second primary coil 11-2 is electrically connected to the second battery 50, and a second end of the second primary coil 11-2 is grounded through the second switch 30.

A first end of the secondary coil 12 is electrically connected to the central electrode 2, a second end thereof is grounded. A diode 13 is provided between ground and a second end of the secondary coil 12, and accordingly, the discharge current generated between the primary coil and the secondary coil 12 flows only to the central electrode 2.

In an embodiment, the first battery 40 employed in the vehicle may be a high voltage battery (e.g., 48V battery), and the second battery 50 may be a low voltage battery (e.g., 12V battery). The high voltage battery may be mainly used for supplying power to a drive motor that generates power required for driving the vehicle, and the low voltage battery may be mainly used for supplying power to electric components.

In an embodiment, a winding ratio A1 (hereinafter referred to as 'first winding ratio') between the first primary coil 11-1 and the secondary coil 12 and a winding ratio A2 (hereinafter referred to as 'second winding ratio') between the second primary coil 11-2 and the secondary coil 12 may be set differently.

For example, the number of windings N2 of the secondary coil 12 is fixed, the number of windings N1-1 of the first primary coil 11-1 may be set greater than the number of windings N1-2 of the second primary coil 11-2. Therefore, the winding ratio (A1=N1−1/N2) between the first primary coil 11-1 and the secondary coil 12 may be set greater than the winding ratio (A2=N1-2/N2) between the second primary coil 11-2 and the secondary coil 12.

This may be expressed in an equation as follows.

$$(A1 = N1{-}1/N2) > (A2 = N1{-}2/N2) \quad \text{Equation 1}$$

Since the first winding ratio A1 is set greater than the second winding ratio A2, an induced voltage V2-2 induced at the secondary coil 12 at the time when the electrical power is supplied from the second battery 50 to the second primary coil 11-2 that is a low voltage battery may remain at an equivalent level with the induced voltage V2-1 induced at the secondary coil 12 at the time when the electrical power is supplied from the first battery 40 to the first primary coil 11-1 that is a high voltage battery.

This may be expressed in an equation as follows.

$$\{V2{-}1 = (N2/N1{-}1)\cdot V1-1\} \approx \{V2{-}2 = (N2/N1{-}2)\cdot V1-2\} \quad \text{Equation 2}$$

$$(V2{-}1 = V1{-}1/A1) \approx (V2{-}2 = V1{-}2/A2)$$

Here, V1-1 denotes the voltage of the first battery 40 that is the high voltage battery, V1-2 denotes the voltage of the second battery 50 that is the low voltage battery, and V1-1 is greater than V1-2.

Since the first winding ratio A1 is greater than the second winding ratio A2, and the voltage of the first battery 40 that is the high voltage battery is greater than the voltage of the second battery 50 that is the low voltage battery, the induced voltage induced at the secondary coil 12 may be constantly maintained, even if the voltage applied to the primary coil varies.

That is, by adjusting the number of windings N1-1 of the first primary coil 11-1 and the number of windings N1-2 of the second primary coil 11-2, the induced voltage induced at the secondary coil 12 may be constantly maintained. Through this, it is possible to maintain a constant level of discharge voltage generated in the spark plug 1, and it is possible to prevent the drivable range of the engine from being limited.

The electrical power of the first battery 40 is supplied from the first battery 40 to the first primary coil 11-1 by turning ON or OFF of the first battery switch 41, and the electrical power of the second battery 50 is supplied from the second battery 50 to the second primary coil 11-2 by turning ON or OFF of the second battery switch 51. The first battery switch 41 and the second battery switch 51 may be implemented as on/off switches.

The first switch 20 adjusts charging and discharging of the first primary coil 11-1, and the second switch 30 adjusts charging and discharging of the second primary coil 11-2. To this end, the first switch 20 and the second switch 30 may be implemented as a transistor switch (e.g., IGBT, insulated gate bipolar transistor).

That is, the first switch 20 includes a first emitter terminal 21, a first base terminal 22, and a first collector terminal 23, where the first emitter terminal 21 is grounded, the first base terminal 22 receives the control signal, and the first collector terminal 23 is selectively and electrically connected to the first battery 40 through the first battery switch 41. In addition, the second switch 30 includes a second emitter terminal 31, a second base terminal 32, and a second collector terminal 33, where the second emitter terminal 31 is grounded, the second base terminal 32 receives the control signal, and the second collector terminal 33 is selectively and electrically connected to the second battery 50 through the second battery switch 51.

An ignition coil system according to an embodiment may further include the controller 60 configured to control operations of the first battery switch 41, the second battery switch 51, the first switch 20, and the second switch 30. To this end, the controller 60 may be implemented with one or more processors that operate according to a preset program, and program instructions programmed to perform each step of a method according to the present disclosure through the one or more processor are stored in the memory of the controller.

When the first battery switch 41 is turned ON and the second battery switch 51 is turned OFF, the electrical power is supplied from the first battery 40 to the first primary coil 11-1. When the first battery switch 41 is turned OFF and the second battery switch 51 is turned ON, the electrical power is supplied from the second battery 50 to the second primary coil 11-2.

When the controller 60 applies the control signal to the first base terminal 22 of the first switch 20, the first primary coil 11-1 of the ignition coil 10 receives current, and the first primary coil 11-1 is charged with electrical energy. When the controller 60 does not apply the control signal to the first base terminal 22 of the first switch 20, the high voltage current (or, discharge current) is generated at the secondary coil 12, by the electromagnetic induction between the first primary coil 11-1 and the secondary coil 12. The discharge current generated at the secondary coil 12 flows to the central electrode 2, and the spark discharge is generated between the central electrode 2 and the ground electrode 3 by the discharge current generated at the secondary coil 12, thereby igniting the air/fuel mixture within the combustion chamber 101.

That is, the controller 60 turns on and off the first switch 20, to charge or discharge the ignition coil 10.

In a state that the first battery 40 is normal, the controller 60 turns ON the first battery switch 41 and turns OFF the second battery switch 51, and accordingly, the electrical power is supplied from the first battery 40 that is the high voltage battery to the first primary coil 11-1 of the ignition coil 10.

When the electrical power is supplied from the first battery 40 that is the high voltage battery to the ignition coil 10, the controller 60 adjusts the dwell time of the control signal applied to the first switch 20 to control charging and discharging of the ignition coil 10.

Figure 3:
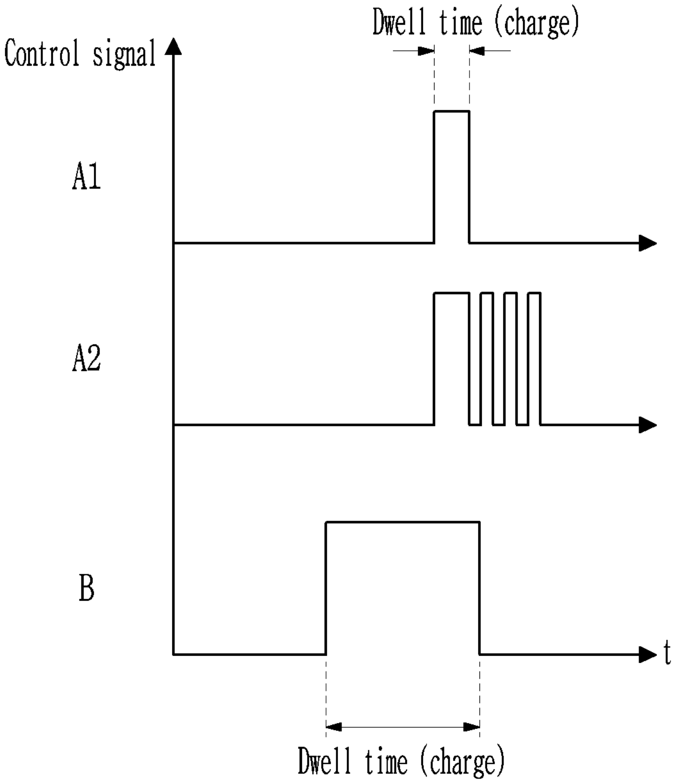
FIG. 3 is a graph showing a control signal according to an embodiment.

For example, when the electrical power is supplied from the first battery 40 to the ignition coil 10, the controller 60 may set the dwell time of the control signal applied to the first switch 20 to be relatively short to charge the ignition coil 10 so as to perform single-stage ignition (refer to 'A1' in FIG. 3), or the controller 60 may perform a multi-stage ignition of the ignition coil 10 through a control signal having plurality of pulses applied to the first switch 20 (refer to 'A2' in FIG. 3).

To the contrary, in a state that the first battery 40 is abnormal (e.g., a state that the state of charge (SOC) of the high voltage battery is very low, or a state that the power of the high voltage battery is blocked due to abnormality, or the like), the controller 60 turns OFF the first battery switch 41 and turns ON the second battery switch 51. Accordingly, the electrical power is supplied from the second battery 50 that is the low voltage battery to the primary coil of the ignition coil 10. Whether the first battery is abnormal or not may be determined by a battery management system (BMS) that manages a battery (e.g., first battery and second battery). Battery management system may continuously manage the state of each of the batteries 40 and 50, and may transmit the state of each battery to the controller 60.

When the electrical power is supplied from the second battery 50 that is the low voltage battery to the ignition coil 10, the controller 60 adjusts the dwell time of the control signal applied to the second switch 30 to control charging and discharging of the ignition coil 10. The dwell time may mean a conduction time of a current applied to a primary coil to secure electrical energy required for ignition.

At this time, the dwell time of the control signal for controlling the charge at the time of charging the ignition coil 10 through the second battery 50 is set longer than the dwell time of the control signal at the time of charging the ignition coil 10 through the first battery 40 (refer to 'B' in FIG. 3).

As such, by setting the dwell time of the control signal for controlling the charge of the ignition coil 10 through the second battery 50 that is the low voltage battery to be relatively long, sufficient ignition energy may be secured at the time of charging the ignition coil 10 through the second battery 50 having a relatively low output voltage.

Subsequently, an ignition coil system according to another embodiment of the present disclosure will be described in detail with reference to the accompanying drawings.

Figure 4:
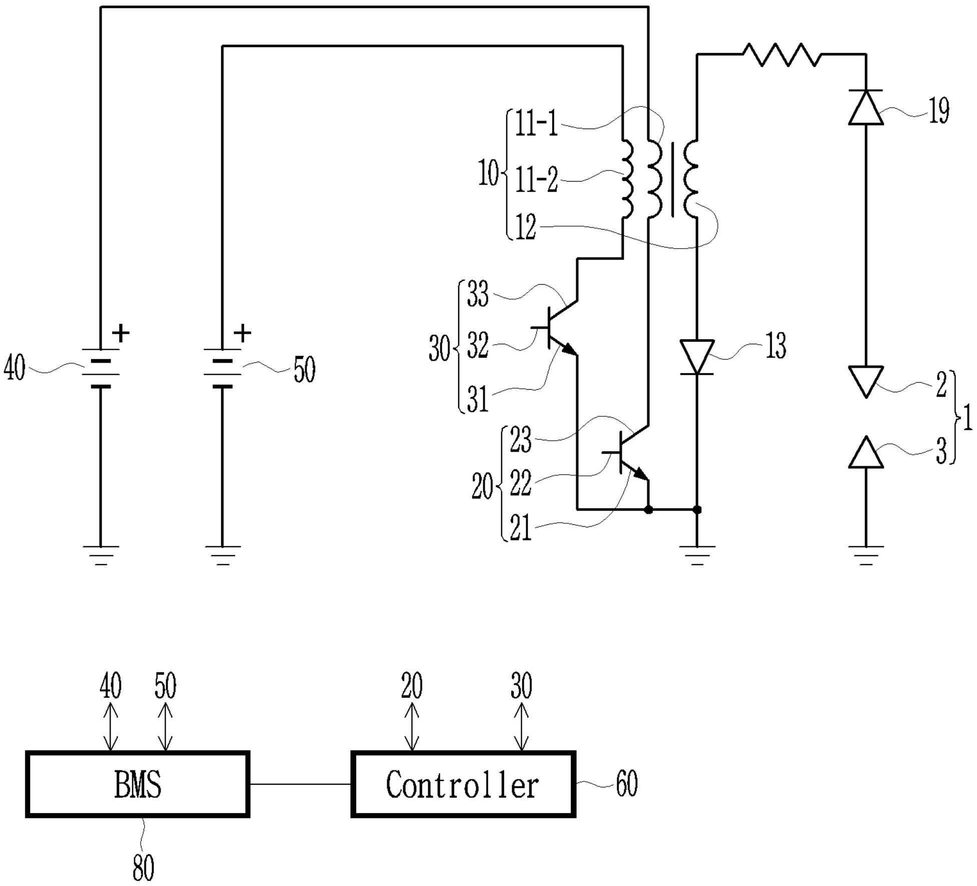
FIG. 4 is a drawing showing a configuration of an ignition coil system according to another embodiment.

FIG. 4 is a drawing showing a configuration of an ignition coil system according to another embodiment.

Referring to FIG. 4, an ignition coil system according to another embodiment of the present disclosure may include the ignition coil 10 including the first primary coil 11-1, the second primary coil 11-2, and the secondary coil 12, the first battery 40 configured to supply electrical power to the first primary coil 11-1, the second battery 50 configured to supply electrical power to the second primary coil 11-2, the first switch 20 configured to adjust charging and discharging of the first primary coil 11-1, and the second switch 30 configured to adjust charging and discharging of the second primary coil 11-2.

An ignition coil system according to another embodiment of the present disclosure is different from the ignition coil system described with reference to FIG. 2 in that the first battery switch 41 and the second battery switch 51 are removed. Therefore, a detailed description of the same components as the ignition coil system of FIG. 2 will be omitted.

According to the ignition coil system of FIG. 4, in a state that the first battery 40 is normal, the controller 60 does not apply the control signal to the second base terminal 32 of the second switch 30, but applies the control signal to the first base terminal 22 of the first switch 20, to control charging and discharging of the first primary coil 11-1. At this time, as described above, the controller 60 may set the dwell time of the control signal applied to the first base terminal 22 to be relatively short to charge the first primary coil 11-1 of the ignition coil 10 so as to perform single-stage ignition, or may perform a multi-stage ignition of the ignition coil 10 through a control signal having a plurality of pulses. The multi-stage ignition means that spark discharges are generated multiple times between the center electrode 2 and the ground electrode 3 during one explosion stroke of the engine.

To the contrary, in a state that the first battery 40 is abnormal, the controller 60 does not apply the control signal to the first base terminal 22 of the first switch 20, but applies the control signal to the second base terminal 32 of the second switch 30, to control charging and discharging of the second primary coil 11-2. At this time, as described above, the controller 60 sets the dwell time of the control signal to be relatively long to charge the second primary coil 11-2, and performs a single-stage ignition.

Operations related to charging and discharging of the ignition coil 10 by the ignition coil system according to another embodiment of the present disclosure are the same as those of the ignition coil system of FIG. 2, and are not described in further detail.

Compared to the ignition coil system of FIG. 2, the first battery switch 41 and the second battery switch 51 are removed from the ignition coil system of FIG. 4. Through this, the total number of parts of the ignition coil system may be reduced, and through this, the manufacturing cost of the vehicle may be reduced.

As described above, according to an ignition coil system according to an embodiment, in a vehicle provided with a plurality of batteries, when one battery does not operate normally, the electrical power (or current) may be stably supplied to the ignition coil 10 through another battery.

In addition, even if the magnitude of the voltage applied from the low voltage battery and the high voltage battery to the primary coil changes, the magnitude of the induced voltage induced in the secondary coil may be maintained constant, and accordingly, the drivable range of the engine may be prevented from being limited.

In addition, by stably supplying electrical power to the ignition coil 10, degradation of catalytic converter in the vehicle may be prevented, and stable driving of the vehicle may be ensured.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. An ignition coil system, comprising:

an ignition coil comprising a first primary coil, a second primary coil, and a secondary coil, the ignition coil being configured to generate a discharge current by electromagnetic induction with the first primary coil or the second primary coil;

a first battery selectively and electrically connected to the first primary coil;

a second battery selectively and electrically connected to the second primary coil;

a first battery switch positioned between the first primary coil and the first battery, the first battery switch being configured to selectively block electrical power supplied from the first battery to the first primary coil;

a second battery switch positioned between the second primary coil and the second battery, the second battery switch being configured to selectively block electrical power supplied from the second battery to the second primary coil;

a first switch configured to adjust charging and discharging of the first primary coil; and a second switch configured to adjust charging and discharging of the second primary coil.

2. The ignition coil system of claim 1, wherein the first battery is a high voltage battery, and the second battery is a low voltage battery.

3. The ignition coil system of claim 1, wherein, when the first battery operates normally, the first battery switch is turned ON, and the second battery switch is turned OFF.

4. The ignition coil system of claim 3, wherein, when the first battery operates abnormally, the first battery switch is turned OFF, and the second battery switch is turned ON.

5. The ignition coil system of claim 3, wherein a dwell time for charging the second primary coil through the second battery is set to be longer than a dwell time for charging the first primary coil through the first battery.

6. An ignition coil system, comprising:

an ignition coil comprising a first primary coil, a second primary coil, and a secondary coil; a first battery selectively and electrically connected to the first primary coil; a second battery selectively and electrically connected the second primary coil; a first switch configured to selectively block electrical power supplied from the first battery to the first primary coil, and configured to adjust charging and discharging of the first primary coil; and a second switch configured to selectively block electrical power supplied from the second battery to the second primary coil, and configured to adjust charging and discharging of the second primary coil; and wherein the first battery is a high voltage battery, and the second battery is a low voltage battery.

7. The ignition coil system of claim 6, wherein the first switch is a transistor switch that comprises:

a first emitter terminal that is grounded;

a first base terminal configured to receive a control signal; and a first collector terminal electrically connected to the first battery.

8. The ignition coil system of claim 7, wherein the second switch is a transistor switch that comprises:

a second emitter terminal that is grounded;

a second base terminal configured to receive a control signal; and a second collector terminal electrically connected to the second battery.

9. The ignition coil system of claim 8, wherein, when the first battery operates normally:

the control signal is applied only to the first base terminal; and the first primary coil is charged and discharged by the control signal received at the first base terminal.

10. The ignition coil system of claim 8, wherein, when the first battery operates abnormally:

the control signal is applied only to the second base terminal; and the second primary coil is charged and discharged by the control signal received at the second base terminal.

11. The ignition coil system of claim 8, wherein a dwell time for charging the second primary coil through the second battery is set to be longer than a dwell time for charging the first primary coil through the first battery.

* * * * *